United States Patent [19]

Silverman

[11] 4,275,665

[45] Jun. 30, 1981

[54] VARIABLE CONFIGURATION CONTAINER WITH MODULAR, EASILY REMOVABLE WALL OR SHELF STRUCTURE

[75] Inventor: Richard V. Silverman, Los Angeles, Calif.

[73] Assignee: Bonus-Bilt, Inc., Glendale, Calif.

[21] Appl. No.: 26,018

[22] Filed: Apr. 2, 1979

[51] Int. Cl.³ ............................................. A47B 85/00
[52] U.S. Cl. ....................................... 108/14; 49/465; 108/111; 280/79.3
[58] Field of Search .................. 108/14, 111, 27, 143; 211/189, 195, 186; 49/465, 382; 292/DIG. 30, 175; 280/79.3

[56] References Cited

U.S. PATENT DOCUMENTS

| | | | |
|---|---|---|---|
| 1,904,110 | 4/1933 | Willmann | 49/465 X |
| 2,598,800 | 6/1952 | Kopper | 108/14 |
| 2,896,277 | 7/1959 | Halligan | 49/465 |
| 2,928,146 | 3/1960 | Kuniholm | 49/465 |
| 2,994,441 | 8/1961 | Browning, Jr. | 211/189 |
| 3,797,842 | 3/1974 | Swick, Jr. et al. | 211/186 X |
| 3,907,150 | 9/1975 | Jurasek | 292/DIG. 30 |
| 3,908,562 | 9/1975 | Wittschen | 108/111 |
| 4,045,043 | 8/1977 | Fourrey | 108/111 |
| 4,066,022 | 1/1978 | Graves | 108/14 |
| 4,142,329 | 3/1979 | Williams | 49/465 |

*Primary Examiner*—Roy D. Frazier
*Assistant Examiner*—Peter A. Aschenbrenner
*Attorney, Agent, or Firm*—Gene W. Arant

[57] ABSTRACT

A complete container includes a container frame, plus one or more modular insert structures which are removably attached to the frame to serve either as shelves, or as wall sections, as may be selected in a particular instance. The container frame includes a vertical rear wall and a pair of vertical side walls which are perpendicular to the rear wall. Each modular insert is of rectangular configuration and of such a length as to fit between the side walls of the container frame. The modular insert may be placed in a vertical plane between the front edges of the side walls in which case it serves as a wall section; or it may be placed in a horizontal plane between the side walls, in which event it acts as a shelf.

Each modular insert is removably attached at its ends to the respective side walls. The attachment means are arranged in such a way as to be conveniently operated by hand, whenever the modular structure is to be inserted between the side walls or removed from them.

9 Claims, 5 Drawing Figures

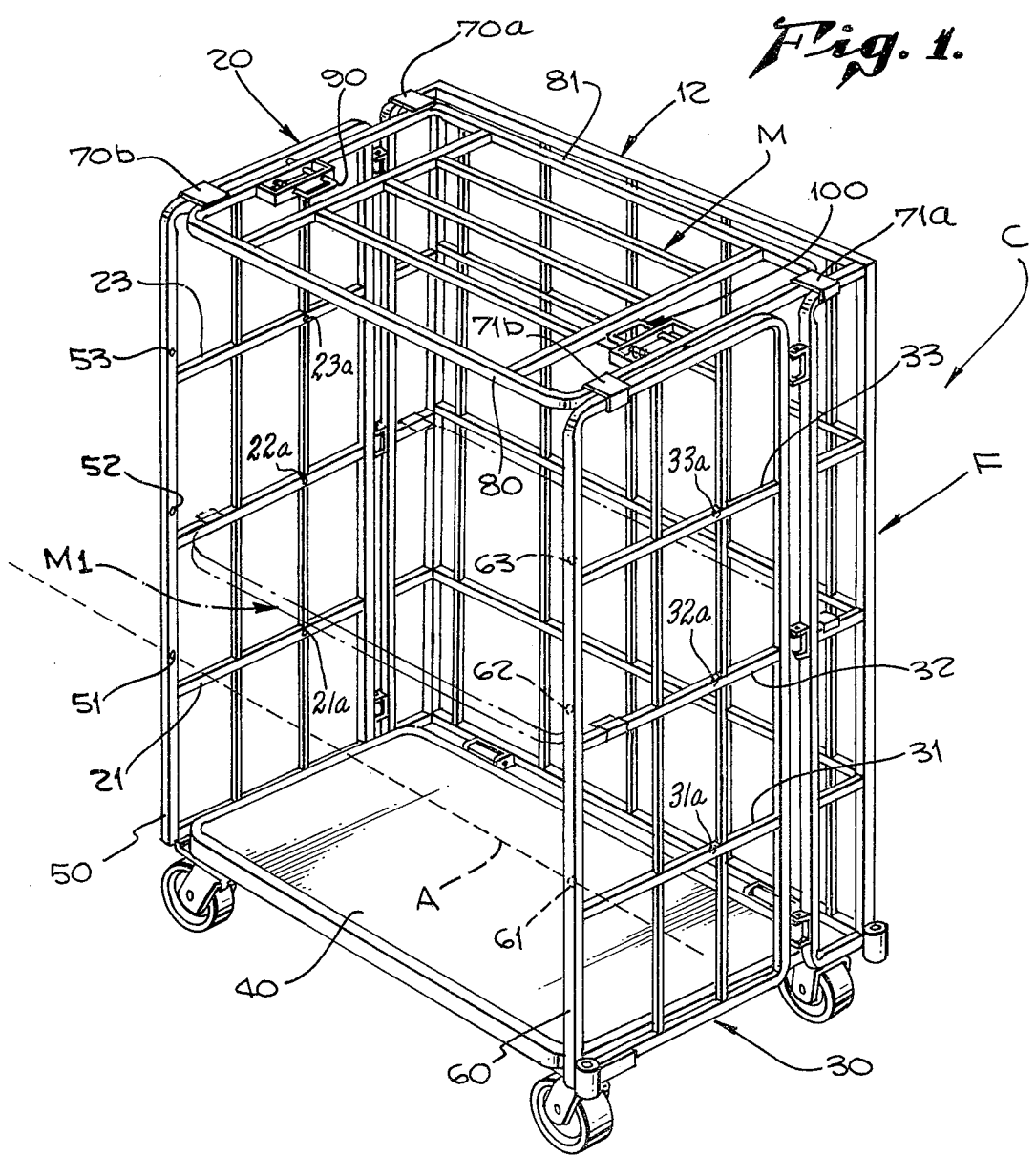
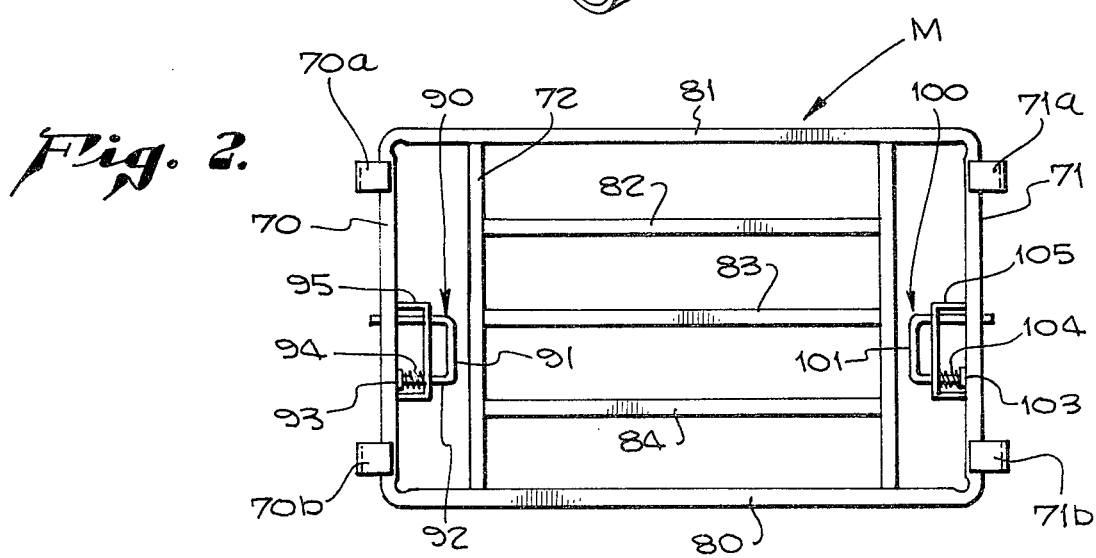

VARIABLE CONFIGURATION CONTAINER WITH MODULAR, EASILY REMOVABLE WALL OR SHELF STRUCTURE

BACKGROUND OF THE INVENTION

The present invention relates to material handling containers, and more specifically, to such containers whose configuration may be varied or selected to meet a particular requirements.

In the material handling art it is well-known to provide shelves which are removable, or whose vertical spacing can be varied or adjusted. It is also well-known to provide a gate or wall section which can be dropped down or removed for purpose of loading or unloading a container.

There are many different situations where material handling containers are used, and in general the requirements that the container must fulfill differ from one situation to the next. It is therefore advantageous to provide containers whose configurations and capabilities can be varied or selected. Specifically, it is quite advantageous to design or devise the container in such a way that any variations or adjustments that are to be made can be easily accomplished by hand, by the same operator who will be engaged in the loading or unloading of the container.

Thus, more specifically, the present invention relates to a material handling container whose configuration and capabilities can be varied or adjusted, and in which the adjustments or variations can be easily accomplished as a hand operation.

PRIOR ART

Pertinent prior art patents known to the applicant include the following:
Hart U.S. Pat. No. 471,481
Harris U.S. Pat. No. 1,778,075
Wittschen U.S. Pat. No. 3,908,562
Wilson U.S. Pat. No. 3,953,044

SUMMARY OF THE INVENTION

According to the present invention a complete container includes one or more modular inserts or structures, each of which can be selectively used as either a wall section or a shelf. The container frame includes a vertical rear wall and a pair of vertical side walls which are perpendicular to the rear wall. Each modular structure may be aligned in a vertical plane and secured between the front edges of the side walls, in which event it serves as a wall section. Alternatively, the same modular structure or insert may be aligned in a horizontal plane and secured between the side walls of the frame, in which event it operates as a shelf.

The object and purpose of the present invention, therefore, is to provide a material handling container whose configuration or structure is variable or adjustable, and in which the variations or adjustments are accomplished by a modular insert which is capable of being used in two or more different manners.

A further object and purpose of the invention is to provide such a modular insert which is so designed and arranged that it may easily be inserted into and secured to the container frame as a hand operation, or may be easily removed as a hand operation.

DRAWING SUMMARY

FIG. 1 is a perspective view of a material handling container in accordance with the present invention, showing modular inserts used as shelves;

FIG. 2 is a top plan view of one of the inserts;

DETAILED DESCRIPTION

Figure 3:
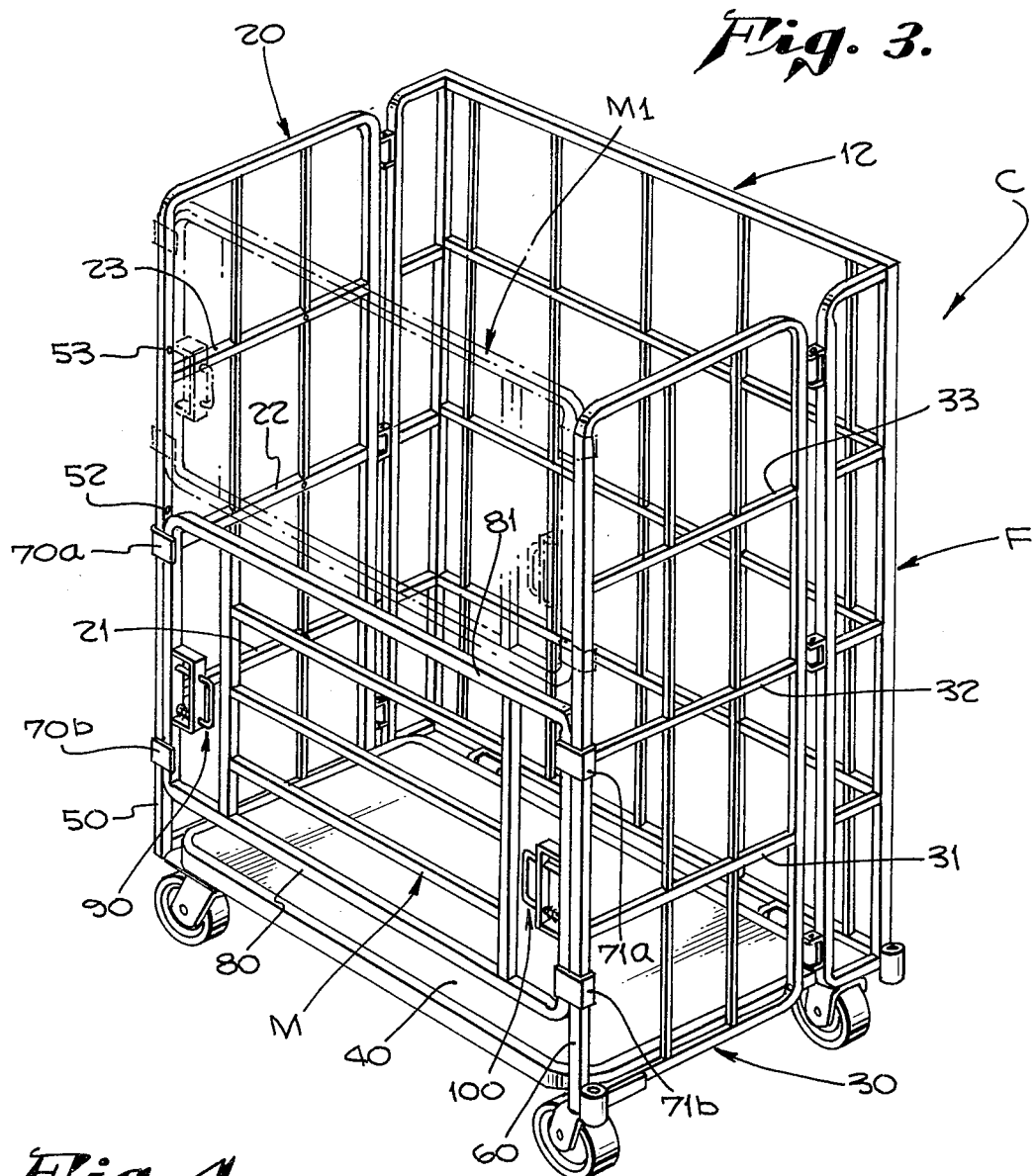
FIG. 3 is a perspective view of a material handling container in accordance with my invention, showing the modular inserts used as wall sections.

The presently preferred embodiment of the invention as shown in the drawings, FIGS. 1 to 5, inclusive, will now be described in detail. In general, the container C includes a frame F together with one or more modules or inserts M. Each module M is adapted to be attached to the frame F by use of the hands H of the operator.

CONTAINER FRAME

Container frame F includes a vertical rear wall 12 and vertical side walls 20, 30, which in the position of use are parallel to each other and perpendicular to the rear wall. However, these side walls may be folded inward against the rear wall. The container frame F also includes a bottom shelf 40 which may be folded upward against the rear wall prior to folding the side walls inwardly. The structure and operation of the container frame may, for example, be closely similar to that in the Wittschen U.S. Pat. No. 3,908,562 and hence need not be described in detail here.

Some additional or special features of the container frame F are described as follows. The structure of side wall 20 includes a front edge bar 50, and in similar fashion the structure of side wall 30 includes a front edge bar 60. Horizontal openings 51, 52, 53 are formed in the front edge bar 50 and open towards the opposite side wall 30. These openings are vertically spaced along the height of the edge bar 50. In similar fashion openings 61, 62, 63 are formed in the front edge bar 60 of side wall 30. The openings 51, 61 form a pair which jointly define a horizontal axis A shown by a dotted line in FIG. 1. Openings 52, 63 are also a pair located on a single horizontal axis, as are the openings 53, 63.

Side wall 20 also includes horizontal stringers or side wall bars 21, 22, 23. The side wall bar 21 is located about one-fourth of the height of the side wall above bottom shelf 40. Side wall bar 22 is located at about the middle of the height of the side wall. And side wall bar 23 is located about one-fourth of the way down from the top of side wall 20. Side wall bars 21, 22, 23 have inwardly facing openings or recesses 21a, 22a, 23a, respectively. In similar fashion the structure of side wall 30 incorporates side wall bars or stringers 31, 32, and 33 having inwardly facing openings or recesses 31a, 32a, 33a. It will be seen that the stringers 21, 31 together define a horizontal plane, as do the pair of stringers 22, 32 and also the pair of stringers 23, 33 and the openings of each pair are aligned on a common axis.

MODULAR INSERT

(Shelf or Wall Structure)

The modular insert M, as best seen in FIG. 2, is of rectangular configuration. It includes parallel end bars 70, 71 which are joined by parallel side bars 80, 81 to form a rectangular outer frame. A spacer bar 72 is located parallel to the end bar 70 and spaced inwardly a few inches from it. In like manner a spacer bar 73 which is parallel to end bar 71 is spaced inwardly a few inches from it. Additional longitudinal supports 82, 83, 84 extend between the spacer bars 72, 73.

Also included in modular insert M are end tabs or lugs 70a, 70b. These tabs are attached to the upper surface of end bar 70 as the module appears in FIG. 2, near the corners of the outer frame. Each tab extends lengthwise beyond the end bar by a distance which is slightly greater than the width of that end bar, and is then hooked downwardly. Similar tabs 71a, 71b are provided on the end bar 71.

The purpose of these tabs is illustrated in FIG. 1 where module M is shown positioned as a shelf at the upper ends of the side walls 20, 30. A second module M1 shown in dotted lines is positioned on the stringers 22, 32. The end tabs of each module extend horizontally above the associated stringer or side wall bar, thereby providing vertical support for the module when used in the shelf mode, and the hooks extend downward over the outer surfaces of the stringers.

The modular insert M also includes two latches, one on each end, which are designed to be operated by hand. Latch 90 in the form of an elongated rod extends longitudinally through an opening in the end bar 70. It is located in the lateral center of the module and in alignment with the longitudinal support member 83. Latch 90 is also provided with a handle 91 which extends perpendicular to the latch member, handle 91 being parallel to the spacer bar 72 and located a relatively short distance therefrom. The same rod member is again bent at a 90 degree angle to provide a latch return or stop 92, which is parallel to the latch bolt 90 itself. A spring retainer 93 is secured to the end of the stop 92 and is normally in engagement with the inner surface of end bar 70. A metal strap 95 has a width considerably greater than the diameter of the latch rod, and is bent into a U-shaped configuration to form a guide for the latch. The base of the U-shaped guide 95 is parallel to handle 91 and located between handle 91 and end bar 70. The outwardly turned ends of the guide are secured to the inner surface of end bar 70, as by welding. The guide 95 has a pair of holes therein to slidably receive both the latch member 90 and the latch stop member 92. Expansion spring 94 acting between spring retainer 93 and guide 95 acts to keep the latch in the normally extended position.

In similar fashion the end bar 71 is provided with a latch member 100 having handle 101 and latch stop 102. A spring retainer 103, spring 104, and latch guide 105 are identical to the corresponding parts at the other end of the modular insert.

Figure 4:
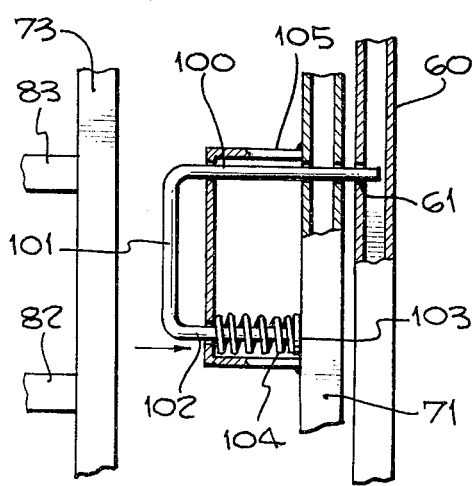
FIG. 4 is a detail plan view, partially in cross-section, of the latch mechanism in one end of the insert.
Figure 5:
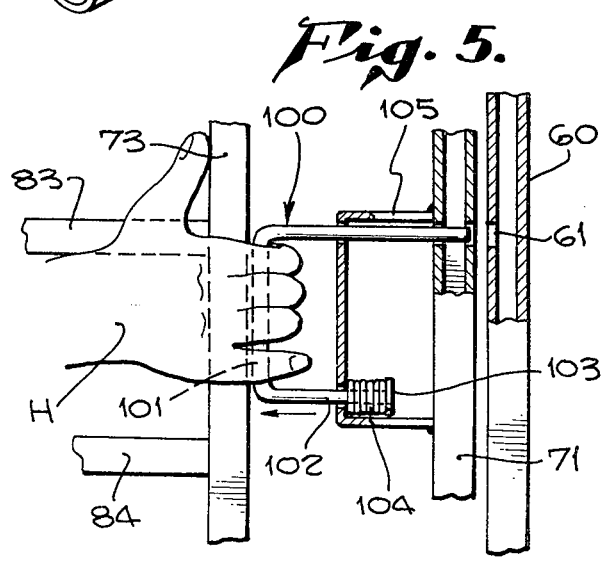
FIG. 5 is a view like FIG. 4 but showing how the latch is operated by hand.

The operation of latch 100 is illustrated in FIGS. 4 and 5. FIG. 4 shows the latch 100 in its operative position received by hole 61 of front edge bar 60. FIG. 5 shows the latch 100 being retracted by the hand H of an operator.

OPERATION

The modular insert M may be used as a shelf as shown in FIG. 1. In that event the end tabs 70a, 70b, 71a, 71b either rest upon the upper ends of the side walls or upon one of the stringer pairs 23, 33 or 22, 32, or 21, 31. The latches are of course retracted before the module is inserted within the container frame F, and this is most conveniently done by the operator through the use of both hands simultaneously. The tabs then bear the vertical load of the shelf and the latches are used principally to prevent dislodgment. The latches are inserted into a pair of openings such as 22a, 32a. The other mode of use of the modular insert M is shown in FIG. 3. The insert is aligned in a vertical plane and inserted between the front edges 50, 60 of the side walls. The end tabs of the module overlap the front surfaces of the front edge bars, thereby ensuring the alignment of the insert in the vertical plane. Latches 90, 100 inserted in the corresponding pair of openings in the front edge bars will carry the vertical load of the wall section.

It will be noted that when the module is used as a wall section the provisions for supporting it vertically are not as great as when it is used as a shelf. However, when the module is used as a wall section is does not carry any load except its own weight. Therefore, the latches do provide a sufficient support for that purpose. When the module is used as a shelf the vertical weight load on the shelf is carried by the end tabs as well as by the latches.

It will be noted that each latch handle 91, 101 is normally positioned close enough to its associated spacer bar 72, 73 so that the two members may be conveniently grasped between the hand of an operator for purpose of squeezing them together. The retracting movement of the latch may, however, inhibited by the spacer bar, as shown in FIG. 5. The spacer bar is therefore positioned far enough away from the associated end bar so that the latch member is fully withdrawn within the associated end bar before the latch stop 92 or 102 strikes the spacer bar. See FIG. 5.

The guide 95 or 105 not only guides the longitudinal sliding movement of both the latch and the latch stop but also protects the mechanism from damage.

ALTERNATE FORMS

The invention is presently illustrated as being incorporated within a material handling cart that has a folding capability. This is convenient when it is desired to store a number of carts that are not in use. Insofar as the invention is concerned, however, the cart may be of a non-folding type. The structure and operation of the modular insert, and its cooperative relationship with the side walls of the container, may still be substantially identical to what has presently been illustrated and described.

For ease of illustration only a single modular insert has been shown incorporated into the material handling cart. It will be understood, however, that in accordance with the invention there may be several such modules used concurrently. For example, two or more modules may be used as shelves while at the same time one or two modules may be used as vertical wall sections.

While the invention has been illustrated in conjunction with a wheeled cart, it will be understood that it may also be applied to a stationary storage facility. That is, a storage area may be provided with a rear wall and a parallel pair of side walls that are perpendicular to the rear wall, and a number of modular inserts provided in accordance with the present invention may be inserted therein and supported between the side walls, some inserts being used in horizontal positions as shelves while others are used in vertical positions as wall sections.

The invention has been described in considerable detail in order to comply with the patent laws by providing a full public disclosure of at least one of its forms.

However, such detailed description is not intended in any way to limit the broad features or principles of the invention, or the scope of patent monopoly to be granted.

What is claimed is:

1. A container having a variable configuration, comprising:

a vertical rear wall;

vertical side walls disposed parallel to each other and perpendicular to said rear wall;

said side walls having vertically extending, parallel front edges, and having a plurality of vertically spaced pairs of transverse openings near said front edges, each pair of openings defining a single horizontal axis;

said side walls also having a plurality of pairs of horizontally extending stringers on the inner surface thereof, each of said stringers also having at least one transverse opening therein, said openings being in matched pairs each of which defines a horizontal axis extending through said container; and a modular shelf or wall structure having a rectangular frame with two ends, a separate latch extending longitudinally from each of said ends, said latches having a single axis, handle means for retracting said latches, and tab means projecting from each of said ends for engaging either said front edges of said side walls or the upper surfaces of a pair of said stringers;

whereby said modular structure may either be placed between said front edges to form a wall section, or upon a pair of said stringers to form a shelf, and is then secured in place by said tab means as well as by the engagement of said latches with the corresponding pair of openings.

2. A container as claimed in claim 1 wherein each of said latches is located at the transverse center of said modular shelf or wall structure, and said tab means at each end thereof includes two separate tabs located on respective sides of the associated latch.

3. A container as in claim 1 wherein said modular shelf or wall structure has a pair of transversely extending end bars forming said two ends of the frame thereof, a pair of transversely extending spacer bars each located inwardly from a corresponding one of said end bars, and wherein each of said latches has a separate latch handle that is disposed between the associated end bar and the associated spacer bar in substantially parallel relationship to both of said bars.

4. A container as in claim 3 which further includes a latch guide associated with each of said latches, and spring means maintaining each of said latches in a normally extended position.

5. A container having a variable configuration, comprising:

a vertical rear wall;

vertical side walls disposed parallel to each other and perpendicular to said rear wall, said side walls having vertically extending, parallel front edge bars;

said side walls also having a plurality of pairs of horizontally extending stringers on the inner surfaces thereof;

a modular shelf or wall structure having a rectangular frame with two ends, separate latch means on each of said ends, handle means for retracting said latches, and tab means projecting from each of said ends for engaging either the front surfaces of said front edge bars or the upper surfaces of a pair of said stringers;

whereby said modular structure may either by placed between said front edges to form a wall section, or upon a pair of said stringers to form a shelf, and is then secured in place by said tab means as well as by the engagement of said latches with the corresponding edge bars or stringers.

6. A container as in claim 5 wherein each of said latch means includes spring means urging the same towards a closed position, a separate retracting handle, wherein said modular shelf or wall structure includes a stationary member that is so positioned relative to said latch handle that both of said members may be grasped within a single hand of an operator for purpose of retracting the associated latch.

7. A wall or shelf structure adapted to be removably inserted between a spaced pair of parallel members, comprising:

a rectangular frame including a parallel pair of end bars, a parallel pair of side bars whose ends are attached to respective ones of said end bars, and a pair of spacer bars which are positioned adjacent respective ones of said end bars and spaced inwardly therefrom in parallel relation thereto, each of said spacer bars having its ends attached to said side bars;

said frame having a front face, and further including tab means attached to the front face of each of said end bars and extending longitudinally outwardly therefrom, whereby when said frame is inserted between the parallel members said tab means engage the front faces of the corresponding parallel members; and separate latch means associated with each of said end bars, each said latch means including a latch bolt slidable longitudinally through an opening in the corresponding end bar and a handle on said latch bolt, said handle extending parallel to the associated spacer bar and being sufficiently close thereto so that a person may grasp said handle and said spacer bar in one hand and squeeze them together to retract said latch bolt, thereby facilitating the insertion or removal of the wall or shelf structure.

8. A wall or shelf structure as claimed in claim 7 wherein said latch bolt is located at the transverse center of said rectangular frame, and which further includes spring means normally urging said latch bolt towards its extended position.

9. In a removable wall or shelf structure having longitudinally extending latches in corresponding ends thereof for supporting the same in its position of use, the improvement comprising:

a transversely extending end bar having an opening therethrough which slidably receives one of the latches;

a spacer bar positioned inwardly of said end bar and extending parallel thereto;

a handle on the inner end of said latch, positioned between said end bar and said spacer bar and extending parallel to both thereof; and spring means normally urging said one latch towards its extended position;

said handle and said spacer bar being normally close enough together so that they may be squeezed within one hand of a person, but far enough apart so that said latch may be fully retracted.

* * * * *